US012806842B2

(12) United States Patent
Lee et al.

(10) Patent No.: US 12,806,842 B2
(45) Date of Patent: Nov. 24, 2026

(54) METHOD FOR PREPARING RECYCLED ABS RESIN

(71) Applicant: LG CHEM, LTD., Seoul (KR)

(72) Inventors: Sang Ho Lee, Daejeon (KR); Hyun Taek Oh, Daejeon (KR); Seong Beom Heo, Daejeon (KR); Gyo Hee Kim, Daejeon (KR); Seon Cheol Cha, Daejeon (KR); Seo Hwa Kim, Daejeon (KR); Yeong Min Kim, Daejeon (KR); Sang Cheol Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 547 days.

(21) Appl. No.: 18/280,582

(22) PCT Filed: Feb. 16, 2023

(86) PCT No.: PCT/KR2023/002303

§ 371 (c)(1),
(2) Date: Sep. 6, 2023

(87) PCT Pub. No.: WO2023/182664

PCT Pub. Date: Sep. 28, 2023

(65) Prior Publication Data

US 2025/0083371 A1 Mar. 13, 2025

(30) Foreign Application Priority Data

Mar. 23, 2022 (KR) ........................ 10-2022-0036336

(51) Int. Cl.

| | |
|---|---|
| ***B29C 48/00*** | (2019.01) |
| ***B29C 48/78*** | (2019.01) |
| ***B29K 55/02*** | (2006.01) |
| ***B29K 75/00*** | (2006.01) |
| ***B29K 105/26*** | (2006.01) |
| ***C08J 11/24*** | (2006.01) |
| ***C08L 55/02*** | (2006.01) |

(52) U.S. Cl.

CPC ........ *B29C 48/022* (2019.02); *B29C 48/0022* (2019.02); *B29C 48/78* (2019.02); *C08J 11/24* (2013.01); *C08L 55/02* (2013.01); *B29C 2793/009* (2013.01); *B29K 2055/02* (2013.01); *B29K 2075/00* (2013.01); *B29K 2105/26* (2013.01); *B29K 2995/0012* (2013.01); *C08J 2355/02* (2013.01); *C08J 2475/04* (2013.01)

(58) Field of Classification Search

CPC .............. B29C 48/0022; B29C 48/022; B29C 48/03; B29C 48/78; B29B 7/48; B29B 7/66; B29B 7/72; B29B 7/88; B29B 9/06; B29B 11/10; B29K 2055/02; B29K 2075/00; B29K 2105/26; B29K 2995/0012; B29K 2255/02; B29K 2995/001; C08L 55/02; C08J 11/22; C08J 11/24; C08J 2355/02; C08J 2475/04; C08J 2375/04; Y02W 30/62

See application file for complete search history.

(56) References Cited

U.S. PATENT DOCUMENTS

| | | | |
|---|---|---|---|
| 5,811,036 | A | 9/1998 | Takahashi et al. |
| 7,138,435 | B2 | 11/2006 | Oyasato et al. |

FOREIGN PATENT DOCUMENTS

| | | | | |
|---|---|---|---|---|
| CN | 102618010 | A | | 8/2012 |
| CN | 103374145 | A | | 10/2013 |
| CN | 107955206 | A | | 4/2018 |
| CN | 113354863 | A | | 9/2021 |
| CN | 113402770 | A | | 9/2021 |
| JP | 6-155474 | A | | 6/1994 |
| JP | H06-198652 | A | | 7/1994 |
| JP | H07-178732 | A | | 7/1995 |
| JP | 8-20023 | A | | 1/1996 |
| JP | 2000-505125 | A | | 4/2000 |
| JP | 3178249 | B2 | | 6/2001 |
| JP | 2002105210 | A | | 4/2002 |
| JP | 3402706 | B2 | | 5/2003 |
| JP | 2005-281334 | A | | 10/2005 |
| JP | 3993056 | B2 | | 10/2007 |
| JP | 4077147 | B2 | | 4/2008 |
| JP | 2011-126995 | A | | 6/2011 |
| JP | 2016199718 | A | | 12/2016 |
| JP | 2022105210 | A | | 7/2022 |
| KR | 2000-0018319 | | * | 4/2000 |
| KR | 10-2000-0062906 | A | | 10/2000 |
| KR | 10-0286925 | B1 | | 4/2001 |
| KR | 10-2002-0056162 | A | | 7/2002 |
| KR | 10-0937473 | B1 | | 1/2010 |
| KR | 10-2010-0038502 | A | | 4/2010 |
| KR | 10-2018-0092577 | A | | 8/2018 |

(Continued)

OTHER PUBLICATIONS

English translation of KR 2000-0018319. (Year: 2000).*
English translation of CN 102618010. (Year: 2012).*
Dos Santos, et al., Using Different Catalysts in the Chemical Recycling of Waste From Flexible Polyurethane Foams, Polimeros, vol. 23, n. 5, p. 608-613, 2013.
International Search Report and Written Opinion issued in corresponding International Patent Application No. PCT/KR2023/002303, dated May 19, 2023.
Notice of Allowance dated May 7, 2025 issued in Japanese Patent Application No. 2023-557409.

(Continued)

*Primary Examiner* — John J DeRusso
*Assistant Examiner* — Joseph S Leyson
(74) *Attorney, Agent, or Firm* — Morgan, Lewis & Bockius LLP

(57) ABSTRACT

Provided is a method for preparing a recycled ABS resin, and the method for preparing a recycled ABS resin includes: preparing an extrusion feed including an acrylonitrile butadiene styrene (ABS) base resin including polyurethane, a metal carboxylic acid salt, and a polyhydric alcohol; and supplying the extrusion feed to an extruder to perform a depolymerization reaction of the polyurethane and extruding the extrusion feed.

12 Claims, No Drawings

(56) References Cited

FOREIGN PATENT DOCUMENTS

| | | | |
|---|---|---|---|
| KR | 10-2298116 | B1 | 9/2021 |
| WO | 2021/023889 | A1 | 2/2021 |

OTHER PUBLICATIONS

Supplementary European Search Report dated Nov. 26, 2024, issued in corresponding European Application No. 23761041.5. (Note: JP3178249A was previously cited).

* cited by examiner

METHOD FOR PREPARING RECYCLED ABS RESIN

TECHNICAL FIELD

Cross-Reference to Related Applications

The present application claims the benefit of priority to Korean Patent Application No. 10-2022-0036336, filed on Mar. 23, 2022, the entire contents of which are incorporated herein as a part of the specification.

Technical Field

The present invention relates to a method for preparing a recycled resin, in particular, a recycled ABS resin.

BACKGROUND ART

Recently, since plastics having various uses and physical properties required for purposes have been developed, the use of plastics is increasing. In general, plastics use a lot of energy from crude oil collection to manufacturing, and a large amount of carbon is discharged in the process. Furthermore, when final products are discarded and plastics included in the products are also discarded, social costs for environmental pollution by the plastics and the treatment thereof are consumed. Thus, it is essential to recycle discarded plastics for reducing energy consumption, reducing carbon emission, and preventing environmental pollution. As such, plastics manufactured by recycling plastics discarded after being used by a final consumer are referred to as post-consumer recycled (PCR) resin, and attempts and efforts to obtain PCR resin having desired purity and physical properties continue to be made.

Meanwhile, an acrylonitrile butadiene styrene (ABS) resin, which is a copolymer of acrylonitrile, butadiene, and styrene, is a plastic which is more resistant to impact and heat than general plastics and a plastic raw material which easily implements beautiful appearance and various colors, and thus, is used as a material for a wide range of products such as home appliances, office equipment, automobile interior and exterior material, and toys. Due to an increase of products to which the ABS resin is applied, ABS resin usage has been rapidly increasing in recent years. Therefore, when products to which the ABS resin is applied are discarded, the need for recycling waste ABS resin included in the products is also increasing.

Meanwhile, a method for recycling waste plastic (resin) includes mechanical recycling, chemical recycling, and thermal recycling. The mechanical recycling is a method of crushing and selecting collected waste plastics, separating the waste plastics by type, melting the plastics to be pelletized, and mixing the plastics with a new material at a specific ratio to manufacture a resin product. The chemical recycling is a method of extracting only a specific polymer using various chemical means from waste plastics, or collecting and repolymerizing pure monomolecules. The thermal recycling is a method of burning waste plastics to recover plastics as heat energy.

When the waste ABS resin is treated by the mechanical recycling method, it is not easy to select the waste plastic as a single type. The waste plastics are usually separated by type by applying a series of methods such as specific gravity separation, optical selection/separation, fine selection, and magnetic selection stepwise. However, plastics which have been separated and selected usually include foreign matter at a level of 1 to 5%. The foreign matter is composed of various components such as paper, ceramic, different kinds of plastics, carbides, metallic foreign matter, and dust. When waste ABS resin including various impurities is melted at a high temperature to be pelletized as such, deformation of recycled resin or PCR resin prepared or deterioration of physical properties such as deterioration of surface properties may occur due to various impurities included in the waste ABS resin. In particular, in the case of recycled ABS resin obtained from large waste home appliances such as washing machines and refrigerators, it is impossible to separate adhesives such as urethane-based insulation and a problem of deteriorating surface properties is caused. The chemical recycling is a method of changing the molecular structure of recycled plastic itself to recycle it into a raw material, and in order to change a molecular structure already bound in the ABS resin which is a terpolymer again, the reaction and the process become difficult.

Therefore, the need for preparing a recycled ABS resin which has no deterioration of physical properties as compared with a new ABS resin before being applied to a product is emerging.

DISCLOSURE

Technical Problem

In order to solve the problems mentioned in the Background Art, an object of the present invention is to provide a method for preparing a recycled ABS resin which is improved with almost no degree of deterioration of appearance characteristics and is minimally deformed as compared with a new ABS resin.

That is, an abject of the present invention is to provide a method for preparing a recycled ABS resin from an ABS base resin by an extruder, which may prevent deterioration of surface characteristics of a recycled ABS resin by polyurethane and other impurities, using depolymerization of polyurethane included in the ABS base resin.

Technical Solution

In one general aspect, a method for preparing a recycled ABS resin includes: preparing an extrusion feed including an acrylonitrile butadiene styrene (ABS) base resin including polyurethane, a metal carboxylic acid salt, and a polyhydric alcohol; and supplying the extrusion feed to an extruder to perform a depolymerization reaction of the polyurethane and extruding the extrusion feed.

Advantageous Effects

According to the method for preparing a recycled ABS resin of the present invention, a polyhydric alcohol which is stable in a high temperature and high pressure environment in an extruder is included in an extrusion feed supplied to the extruder, thereby stably performing a depolymerization reaction of polyurethane included in an ABS base resin.

Furthermore, a metal carboxylic acid salt which may increase a reaction rate of the depolymerization reaction is included in the extrusion feed, thereby achieving a desired degree of the depolymerization of polyurethane in spite of a short residence time of the extrusion feed in the extruder. Also, by the short residence time, deterioration of depolymerization reactants including ABS resin, additives, and the like by heat may be prevented and a recycled ABS resin which is less deformed and has equivalent physical properties to a new ABS resin may be obtained.

BEST MODE

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

In the present invention, an ABS resin or an ABS (co) polymer is a concept which collectively refers to not only a resin or a (co)polymer including a conjugated diene-based compound-derived unit, an aromatic vinyl compound-derived unit, and a vinyl cyanide compound-derived unit, but also a resin composition and a (co)polymer composition including the resin or the (co)polymer.

Meanwhile, in the present invention, an ABS base resin, which is an ABS resin which is separated and recovered from discarded products and pretreated, refers to an ABS resin including impurities or foreign matter, and a resin prepared from the ABS base resin by the method for preparing a recycled resin of the present invention is defined as a recycled ABS resin. Furthermore, an ABS resin which is in a state of a mixture of a recycled ABS resin and a new material for applying the recycled ABS resin to a product or in a state of adding an additive for imparting desired physical properties is referred to as a post consumer recycled-ABS (PCR-ABS) resin.

Hereinafter, the present invention will be described in more detail for better understanding of the present invention.

A method for preparing a recycled ABS resin according to an exemplary embodiment of the present invention may include: preparing an extrusion feed including an acrylonitrile butadiene styrene (ABS) base resin including polyurethane, a metal carboxylic acid salt, and a polyhydric alcohol; and supplying the extrusion feed to an extruder to perform a depolymerization reaction of the polyurethane and extruding the extrusion feed.

The ABS resin according to the present invention may be a polymer including a conjugated diene-based compound-derived unit, an aromatic vinyl compound-derived unit, and a vinyl cyanide compound-derived unit. As an example, the ABS resin may be prepared by graft-polymerizing an aromatic vinyl compound and a vinyl cyanide compound onto a conjugated diene-based rubbery polymer. In this case, the ABS resin may include 30 to 60 parts by weight of the aromatic vinyl compound and 10 to 30 parts by weight of the vinyl cyanide compound with respect to 100 parts by weight of the rubbery polymer.

The conjugated diene-based rubbery polymer is preferably one or more selected from the group consisting of a butadiene rubbery polymer, an isoprene rubbery polymer, a chloroisoprene rubbery polymer, and any mixture thereof. The aromatic vinyl compound is preferably one or more selected from the group consisting of styrene, α-methylstyrene, para-methylstyrene, o-ethylstyrene, para-ethylstyrene, and vinyltoluene, and more preferably styrene. The vinyl cyanide compound is preferably one or more selected from the group consisting of acrylonitrile, methacrylonitrile, and ethacrylonitrile, and more preferably acrylonitrile.

The ABS resin has excellent properties such as impact strength, tensile strength, elastic modulus, and flame retardancy and is widely used for home appliances such as refrigerators, automobile parts, various electrical/electronic parts, and the like. For example, when the ABS resin is used as a material of an exterior frame inside and outside a refrigerator, it is common to provide a foam-filled polyurethane foam (PU foam) in a closed space between the exterior frame outside and the exterior frame inside the refrigerator for insulation of the exterior frame, thereby maintaining a cooling temperature inside. When the product using both the ABS resin and polyurethane as such is discarded and a recycled ABS resin is prepared from the waste ABS resin, it is not easy to separate the waste ABS resin and polyurethane due to their strong adhesion. Foreign matter such as polyurethane remaining in the recycled ABS resin is a factor deteriorating the physical properties of the recycled ABS resin or an extruded product manufactured therefrom. In particular, deterioration of surface properties such as a non-uniform gel or a dimple shape may occur on the surface of the product.

Conventionally, it was intended that the waste ABS was filtered using a mesh screen to remove the foreign matter such as polyurethane, but the foreign matter often passed through the mesh screen due to the flexible shape changeability (flexibility) of the polyurethane foam itself, and thus, it was impossible to prepare a recycled ABS resin having high reliability. Therefore, a lot of new material should be mixed for securing the physical properties of the ABS resin which were deteriorated due to the foreign matter, and the recycling rate of the recycled ABS resin in the product was limited.

Thus, the present invention is intended to provide a method in which a metal carboxylic acid salt and a polyhydric alcohol are supplied together in supplying an ABS base resin including foreign matter such as polyurethane to an extruder, thereby promoting an effective depolymerization reaction for polyurethane and minimizing an influence such as an aggregation effect on other foreign matter of polyurethane, and thus, a recycled ABS resin having highly reliable physical properties may be prepared.

First, according to an exemplary embodiment of the present invention, an extrusion feed for reaction extrusion may be prepared in an extruder, in which the extrusion feed may include an acrylonitrile butadiene styrene (ABS) base resin including polyurethane, a metal carboxylic acid salt, and a polyhydric alcohol. For example, the extrusion feed may be a composition including the acrylonitrile butadiene styrene (ABS) base resin, the metal carboxylic acid salt, and the polyhydric alcohol.

The ABS base resin is an ABS resin in a state of being required to be supplied to an extruder, and for example, may be an ABS resin in the form of a flake or particle (pellet or fine powder) having an appropriate size in a state in which large-sized foreign matter has been separated and removed. To this end, a pretreatment of a waste ABS resin may be performed as needed to first prepare an ABS base resin in the form of a flake or particle (pellet or fine powder).

Specifically, in order to prepare the ABS base resin, first, a waste product containing the waste ABS resin is disassembled, the waste ABS resin is separated, and then washed and crushed. In order to separate the waste ABS resin from other resins such as polypropylene (PP), polystyrene (PS), and high impact polystyrene (HIPS), a method such as a wet or dry separation method using specific gravity, a screening classification method using a near infrared spectrometer, and electrostatic separation using electrostatic properties may be used. Foreign matter other than resin, for example, metal components or fiber components may be first separated from a waste ABS resin in a crushed state, and for this, magnetism or difference in specific gravity of a material may be used. Thus, large foreign matter in the waste ABS resin is removed to decrease a total content of foreign matter.

Thereafter, if necessary, the waste ABS resin from which large foreign matter has been removed is pulverized to make a fine powder or flake phase. The pulverization may be performed using a pulverizing device such as, for example, a jaw crusher, an impact crusher, a cross jet mill, a roller mill, and a rod mill. Meanwhile, the waste ABS resin after pulverization may still include some foreign matter.

Furthermore, in order to remove some fine foreign matter included in the waste ABS resin in a pulverized state, equipment using for example, magnetic force, wind force, centrifugal force, gravity, and the like may be used to separate and remove fine foreign matter.

By the pretreatment as such, an ABS base resin in an appropriate state of being supplied to the extruder from the waste ABS resin included in the waste product may be prepared. Meanwhile, each process exemplified by the pretreatment of the waste ABS may be appropriately selected and modified as needed, and is not particularly limited as long as it is a means to provide an ABS base resin in an appropriate state to be supplied to an extruder.

In the ABS base resin, a trace amount of foreign matter may be included. For example, the foreign matter may include various impurities such as a trace amount of fiber material, resin material, stone material, and metal material in addition to polyurethane. The content of the foreign matter may be less than 0.5 wt % with respect to the ABS base resin. When the ABS base resin including the foreign matter even in a small amount is supplied to the extruder without a separate treatment and extruded, the physical properties, in particular, surface properties of the recycled ABS resin, may be deteriorated. Specifically, deterioration of surface properties, such as occurrence of gel or dimple marks on the surface of the recycled ABS resin or a molded article manufactured therefrom may be problematic. This may be direct deterioration of surface properties by polyurethane present on the surface of the ABS base resin, and additionally, may be an effect of the impurities mediated by polyurethane in the foreign matter.

In order to prevent deterioration of the physical properties of the recycled ABS resin due to the foreign matter included in the ABS base resin, the extrusion composition of the present invention may include a polyhydric alcohol and a metal carboxylic acid salt.

The polyhydric alcohol functions as a reactant for a depolymerization reaction of polyurethane included in the ABS base resin in the presence of the metal carboxylic acid salt in the extruder. Meanwhile, the metal carboxylic acid salt may be added for promoting the depolymerization.

The depolymerization reaction may refer to a reaction which breaks a part of the urethane bonds of polyurethane. The depolymerization reaction may not be a reaction which completely decomposes polyurethane into a monomer state, and may refer to a reaction which a high molecular weight polyurethane is decomposed into a low molecular weight polyurethane. Therefore, a decomposition product of the depolymerization reaction of polyurethane includes polyurethane having a smaller molecular weight than polyurethane as a reactant of the depolymerization, and if necessary, may include monomers and oligomers forming the polyurethane.

As described later, a temperature inside the extruder for extruding the ABS base resin may be 200° C. to 280° C. or 230° C. to 260° C. When the extrusion feed stays for a long time in the atmosphere of the temperature inside the extruder as such, deterioration of physical properties such as discoloration of the ABS base resin by heat easily occurs and a side effect by heat such as deterioration of activity of the metal carboxylic acid salt may occur. In order to minimize the side effect by heat as such, it is preferred that the extrusion feed stays in the extruder only for a minimum residence time required for extrusion of the ABS base resin, and for this, it is necessary to effectively perform the depolymerization reaction also for a short time.

From this point of view, the polyhydric alcohol according to an exemplary embodiment of the present invention may be a polyhydric alcohol having a boiling point at or above the temperature inside the extruder. Since the inside of the extruder is a pressurized atmosphere at or higher than atmospheric pressure, a boiling point elevation of the polyhydric alcohol may occur, but as the temperature inside the extruder is similar to the boiling point of the polyhydric alcohol, evaporation of the polyhydric alcohol is promoted, and thus, in order stably perform the depolymerization reaction at the temperature of 200° C. to 280° C. inside the extruder, consequently, the boiling point of the polyhydric alcohol may be at least 200° C. or higher, or more specifically 230° C. or higher. When the boiling point of the polyhydric alcohol is lower than 200° C., the amount of the vaporized polyhydric alcohol is increased so that the amount of the polyhydric alcohol participating in an actual reaction is decreased, and thus, an efficient depolymerization reaction may be difficult. In addition, a backflow phenomenon occurs in the inlet area of the extruder due to the vaporized polyhydric alcohol to cause productivity decline.

A specific example of the polyhydric alcohol may be one or more of glycerin, erythritol, ethylene glycol, diethylene glycol, triethylene glycol, and polyethylene glycol.

Specifically, referring to the following Table 1, it is found that among low molecular weight primary alcohols (for example, methanol, ethanol, and the like) or secondary alcohols, ethylene glycol and the like are alcohols having a boiling point lower than 200° C. When the alcohol having a low boiling point is used, the amount of alcohol vaporized in the extruder is increased as described above, so that the amount of the polyhydric alcohol participating in the real reaction is decreased, and thus, an efficient depolymerization reaction is difficult, or a backflow reaction occurs in an extruder inlet area to cause productivity decline.

Meanwhile, even in the case of an alcohol having a somewhat high boiling point, a high molecular weight primary alcohol (for example, stearyl alcohol and the like), diethylene glycol, triethylene glycol, or the like does not have a high ratio of an OH group to mass, and thus, the effect of the depolymerization reaction of polyurethane may be limited. That is, the alcohols as such may be preferred in terms of the amount vaporized inside the extruder, but may be limited in terms of the depolymerization reaction efficiency of polyurethane.

Furthermore, since a polyhydric alcohol such as arabitol, mannitol, sorbitol, xylitol, and maltitol is a solid phase and has poor compatibility with an ABS resin, it may act as another foreign matter, and thus, may not be preferred.

TABLE 1

| | Molecular weight (g/mol) | Number of OH groups per one molecule | OH group equivalent weight to mass [(1)] | Boiling point (° C.) |
|---|---|---|---|---|
| Methanol (MeOH) | 32 | 1 | 1 | 64.7 |
| Ethanol (EtOH) | 46 | 1 | 0.695 | 78.37 |
| Stearyl alcohol (StOH) | 270 | 1 | 0.118 | 210 |

TABLE 1-continued

| | Molecular weight (g/mol) | Number of OH groups per one molecule | OH group equivalent weight to mass [(1)] | Boiling point (° C.) |
|---|---|---|---|---|
| Ethylene glycol (EG) | 62 | 2 | 1.032 | 197 |
| Diethylene glycol (DEG) | 106 | 2 | 0.604 | 244 |
| Triethylene glycol (TEG) | 150 | 2 | 0.427 | 285 |
| Polyethylene glycol (PEG) | 4000 (Weight average molecular weight) | 2 | 0.008 | — |
| Glycerin (GLY) | 92 | 3 | 1.044 | 290 |
| Erythritol | 122 | 4 | 1.049 | 330.5 |
| Xylitol | 152 | 5 | 1.053 | 216 |
| Polyvinyl alcohol (PVOH) | 44 (per repeating unit) | 1 | 0.728 | — |

[(1)] OH group equivalent weight to mass: a value obtained by dividing the number of OH groups per one molecule by a molecular weight, which is represented by a relative value compared with the case in which methanol is 1.

As described above, as the polyhydric alcohol, one or more of glycerin and erythritol may be preferably applied among the alcohols described above, considering the boiling point (degree of vaporization in an extruder), the ratio of OH group to mass (efficiency of depolymerization reaction), the compatibility with an ABS resin, and the like collectively.

Meanwhile, the content of the polyhydric alcohol in the extrusion feed may be 0.01 parts to 3 parts, specifically 0.1 parts to 0.9 parts with respect to 100 parts of the ABS base resin weight.

When the content of the polyhydric alcohol is less than 0.01 parts by weight, the urethane decomposition reaction is not sufficient so that a foreign matter reduction effect is decreased, and when the content of the polyhydric alcohol is more than 3 parts by weight, mechanical properties such as impact strength are deteriorated.

Meanwhile, according to an exemplary embodiment of the present invention, the extrusion feed may include a metal carboxylic acid salt. The metal carboxylic acid salt may serve to accelerate a depolymerization reaction rate between polyurethane included in the ABS base resin and the polyhydric alcohol. As described above, in order to prepare the recycled ABS resin having less change in physical properties, it is necessary to minimize a heat exposure time of the ABS base resin, and despite the short residence time of the extrusion feed in the extruder by addition of the metal carboxylic acid salt, the depolymerization reaction of polyurethane in the ABS base resin may be performed rapidly and sufficiently.

The metal element of the metal carboxylic acid salt may be potassium and zinc. The carboxylic acid salt of the metal element such as sodium and magnesium does not cause a sufficient urethane decomposition reaction to decrease a foreign matter reduction effect.

The content of the metal carboxylic acid salt included in the extrusion feed may be 0.05 parts to 3 parts, specifically 0.1 parts to 2 parts, and more specifically 0.3 parts to 1 part with respect to 100 parts of the ABS base resin weight. Only when the content of the metal carboxylic acid salt is at least 0.05 parts or more with respect to 100 parts of the ABS base resin weight, the expected effect of promoting the depolymerization reaction of polyurethane by the addition of the metal carboxylic acid salt may be obtained. Meanwhile, only when the content of the metal carboxylic acid salt is 3 parts or less with respect to 100 parts of the ABS base resin weight, an effect of the metal carboxylic acid salt on the physical properties such as color properties of the recycled ABS resin in the extrusion process and the deterioration of the physical properties due to remaining of the metal carboxylic acid salt in the recycled ABS resin may be decreased.

Meanwhile, the carboxylate anion of the metal carboxylic acid salt may be an aliphatic or aromatic carboxylate having 2 to 18 carbon atoms, preferably 2 to 12 carbon atoms. Specifically, the metal carboxylic acid salt may be an aliphatic carboxylate of zinc such as zinc acetate, zinc propionate, zinc butyrate, zinc octoate, zinc decanoate, zinc laurate, and zinc stearate. Meanwhile, the metal carboxylic acid salt may be an aliphatic carboxylate of potassium such as potassium acetate, potassium propionate, potassium butyrate, potassium octoate, potassium decanoate, potassium laurate, and potassium stearate. More specifically, the metal carboxylic acid salt may be zinc acetate and potassium acetate.

The metal carboxylic acid salt has an excellent effect of accelerating a depolymerization reaction rate of polyurethane of the polyhydric alcohol, and in particular, among the metal carboxylic acid salt, zinc acetate and potassium acetate have less structural obstruction in the depolymerization reaction and excellent mobility due to its simple structure, and thus, may be preferred.

Also, according to an exemplary embodiment of the present invention, a mass ratio of the metal carboxylic acid salt to the polyhydric alcohol in the extrusion feed may be 1:10 to 1:0.1, specifically 1:0.3 to 1:1. Within the numerical range, the surface properties of a resin are improved with the increased content of glycerin.

Meanwhile, the extrusion feed may be supplied to the inlet of the extruder in one composition form, and one or more of the components included in the extrusion feed may be supplied through a separate supply line.

The method for preparing a recycled ABS resin according to an exemplary embodiment of the present invention may include supplying the extrusion feed to an extruder to perform the depolymerization reaction of polyurethane and extrude the extrusion feed.

The extruder has a function of melting, kneading, and extruding the ABS base resin, and also performs a function of performing the depolymerization reaction of polyurethane included in the ABS base resin in the extruder and uniformly dispersing the decomposed product of the depolymerized polyurethane. Specifically, the extruder may be a twin screw extruder.

Meanwhile, the extruder according to an exemplary embodiment of the present invention may include a supply port to which the extrusion feed is supplied, an outlet positioned in the other end of the supply port, through which an extrudate is discharged, a cylinder in a housing of the extruder, in which the extrusion feed is extruded, a screw which is positioned inside the cylinder and pushes the extrusion feed or the extrudate in the direction of outlet, and a heating device which is provided in the outside of the cylinder and heats the cylinder.

A temperature inside the extruder may be 200° C. to 280° C., specifically 230° C. to 260° C., and more specifically 240° C. to 260° C. In the case of the extruder having a cylinder inside the extruder housing, a temperature inside the extruder may refer to a temperature inside the cylinder. A temperature range inside the extruder as such is a temperature equivalent to or higher than a melting point and equivalent to or lower than a thermal deterioration temperature of the ABS base resin. However, the temperature range is a temperature higher than the extrusion temperature for conventionally preparing the recycled ABS resin. When the ABS base resin stays for a long time in the extruder with the temperature range, the ABS base resin is prone to deterioration and discoloration by heat, which is directly related to the deterioration of the physical properties of the recycled ABS resin. Furthermore, when the reaction feed stays for a long time in the extruder, the amount of the metal carboxylic acid salt deactivated by heat is increased and the amount of vaporized polyhydric alcohol is also increased, resulting in the deterioration of efficiency of the depolymerization reaction of polyurethane. That is, as the temperature inside the extruder is higher, the depolymerization reaction of polyurethane easily occurs, but when the extrusion feed is exposed to a high temperature for a long time, the problems described above arise, and thus, the efficiency of the depolymerization reaction may be deteriorated. Therefore, when the temperature inside the extruder is maintained at 200° C. to 280° C., it is important to minimize the side effect by heat by making the residence time in the extruder of the extrusion feed short, and in order to perform the depolymerization reaction of polyurethane to a desired level even with the short time, the use of the metal carboxylic acid salt and the polyhydric alcohol of the present invention is essential.

According to the method for preparing a recycled ABS resin of the present invention, the residence time of the extrusion feed in the extruder may be 0.5 minutes to 10 minutes, specifically 1 minute to 5 minutes. Here, the residence time may refer to a time during which the depolymerization reaction of polyurethane proceeds by the metal carboxylic acid salt and the polyhydric alcohol in the extruder.

By the short residence time as such, a time during which the ABS base resin, the metal carboxylic acid salt, and the polyhydric alcohol supplied to the extruder are exposed to heat is minimized, thereby preventing deterioration of physical properties such as discoloration of the recycled ABS resin by heat, deterioration of activity by deterioration of the metal carboxylic acid salt, reduction of reaction efficiency by excessive vaporization of the polyhydric alcohol, and the like. Also, both the metal carboxylic acid salt and the polyhydric alcohol are employed for reaction extrusion, thereby allowing efficient depolymerization of polyurethane in the ABS even with a short residence time. In addition, since the decomposition product by the depolymerization includes polyurethane having sufficiently lowered molecular weight, the decomposition product may be uniformly distributed in the melted and kneaded recycled resin. Thus, it is possible to prepare the recycled ABS resin eventually having good physical properties, for example, good surface properties.

Meanwhile, pressure inside the extruder according to an exemplary embodiment of the present invention may be a normal pressure to 100 bar or less. Within the pressure range, it is easy to control the temperature inside the extruder, and the melting with kneading of the ABS base resin may be preferably performed. In particular, in the pressure range, an efficient depolymerization reaction to polyurethane may be performed.

According to an exemplary embodiment of the present invention, the extrusion composition discharged from the extruder is supplied to a pelletizer to perform pelletization. For example, the extrusion composition discharged through the outlet of the extruder is molded to a desired size by an underwater pelletizer, and finally the recycled ABS resin may be prepared.

Hereinafter, the present invention will be described in more detail by the examples. However, the following examples are provided for illustrating the present invention, and it is apparent to a person skilled in the art that various modifications and alterations may be made without departing from the scope and spirit of the present invention, and the scope of the present invention is not limited thereto.

EXAMPLES

Example 1

A waste ABS resin recovered from a refrigerator was pulverized and classified, large-sized foreign matter was removed by separation in the process, and crushing was performed to prepare an ABS base resin having an average particle diameter (D50) of 15 mm. 100 kg of the ABS base resin, 300 g of zinc acetate as a metal carboxylic acid salt, and 600 g of glycerin as a polyhydric alcohol were supplied to a mixer and mixed to prepare an extrusion feed, which was supplied to an extruder through an extruder supply port.

As the extruder, a twin screw extruder including a cylinder having an inner diameter of 25 mm and having a screw length of 800 mm was used.

While the temperature inside the extruder was maintained at 260° C., the melting with kneading of the ABS base resin was performed in the extruder and also the depolymerization reaction of polyurethane included in the ABS base resin was performed.

At this time, a screw rotation speed was set to 300 rpm to control a residence time to 120 seconds, and the extrusion composition after reaction extrusion was discharged through an outlet of the extruder. The extrusion composition was supplied to a pelletizer to prepare a recycled ABS resin having a diameter of 2 mm.

Examples 2 to 21 and Comparative Examples 1 to 4

Recycled ABS resins were prepared in the same manner as in Example 1, except that the temperature inside the cylinder of the extruder, the metal carboxylic acid salt included in the extrusion feed, and the content of the polyhydric alcohol were as listed in Tables 2 to 5.

In particular, in Examples 9, 10, and 21, recycled ABS resins were prepared in the same manner as in Example 1, except that potassium acetate (Example 9), zinc stearate (Example 10), or sodium acetate (Example 21) was used, respectively, instead of the zinc acetate of Example 1, as the metal carboxylic acid salt.

Meanwhile, in Examples 13 and 14, recycled ABS resins were prepared in the same manner as in Example 1, except that ethylene glycol (Example 13) or polyethylene glycol having a molecular weight of 4,000 (Example 14) were used, respectively, instead of the glycerin of Example 1, as the polyhydric alcohol, and in Comparative Example 4, a recycled ABS resin was prepared in the same manner as in Example 1, except that stearyl alcohol was used instead of the polyhydric alcohol.

EXPERIMENTAL EXAMPLES

The physical properties of the recycled ABS resins prepared in the examples and the comparative examples were measured by the following methods and evaluated, and the results are shown in Tables 2 to 5.

1. Number of Film Gels (Film Foreign Matter Score)

The recycled ABS resin pellet prepared was blended with a styrene-acrylonitrile (SAN)-based copolymer at a mass ratio of 1:9, and then a film specimen having a thickness of 0.02 mm was prepared by extrusion using a separate extruder. Here, the styrene-acrylonitrile (SAN)-based copolymer resin was prepared by mixing 70 parts by weight of styrene, 30 parts by weight of acrylonitrile, 20 parts by weight of ethylbenzene as a solvent, and 0.15 parts by weight of t-dodecylmercaptan as a molecular weight modifier, and continuously adding the mixture to a reaction tank to perform polymerization at a reaction temperature of 148° C.

Thereafter, a Q-film software from Collin was used to count the number of gels in the film. At this time, gel and fiber having a diameter of 100 μm or more were determined as gel in the film specimen prepared above and counted, the gels were classified into sections of gel diameters of 100 μm or more and less than 300 μm, 300 μm or more and less than 500 μm, and 500 μm or more, and the number of gels for each size section was counted and is shown in Tables 2 to 5.

Also, depending on the number of gels measured, 100 μm or more and less than 300 μm was evaluated as 0.03 points, 300 μm or more and less than 500 μm was evaluated as 0.05 points, and 500 μm or more was evaluated as 0.1 points, thereby calculating the film foreign matter score.

2. Number of Injected Dimples (Injected Foreign Matter Score)

A recycled ABS resin pellet prepared was injected to manufacture a block specimen having a size of 5 cm×10 cm. For the block specimen, the number of dimples present on the surface of the block specimen was counted using a high resolution camera. At this time, a shadow having a diameter of 100 μm or more on the surface was determined as a dimple in the block specimen prepared above and counted, the dimples were classified into sections of dimple diameters of 100 μm or more and less than 300 μm, 300 μm or more and less than 500 μm, and 500 μm or more, and the number of dimples for each size section was counted and is shown in Tables 2 to 5.

Also, depending on the number of dimples measured, 100 μm or more and less than 300 μm was evaluated as 0.03 points, 300 μm or more and less than 500 μm was evaluated as 0.05 points, and 500 μm or more was evaluated as 0.1 points, thereby calculating the foreign matter score.

3. Whiteness Index and Yellow Index

The whiteness index and the yellow index were measured with a Hunter Lab. color meter (available from Hunter Lab., U.S.A) using a block specimen having a size of 5 cm×10 cm for measuring the number of injected dimples, and the whiteness index was measured in accordance with the standard of ASTM E313-73 and the yellow index was measured in accordance with the standard of ASTM E313-15. The results are shown in Tables 2 to 5.

TABLE 2

| | | Example 1 | Example 2 | Example 3 | Example 4 | Example 5 | Example 6 | Example 7 |
|---|---|---|---|---|---|---|---|---|
| Temperature in extruder (° C.) | | 260 | 260 | 260 | 260 | 260 | 260 | 260 |
| Content (parts) of metal carboxylic acid salt in extrusion feed [1] | | 0.3 | 0.1 | 2 | 0.3 | 0.3 | 0.3 | 1 |
| Content (parts) of polyhydric alcohol in extrusion feed [2] | | 0.6 | 0.6 | 0.6 | 0.1 | 0.3 | 0.9 | 0.15 |
| Mass ratio 3) | | 0.5 | 0.17 | 3.33 | 3.0 | 1.0 | 0.33 | 6.67 |
| Evaluation of film foreign matter | 100 μm or more and less than 300 μm (number) | 297 | 622 | 293 | 315 | 319 | 306 | 346 |
| | 300 μm or more and less than 500 μm (number) | 24 | 49 | 19 | 26 | 19 | 23 | 20 |
| | 500 μm or more (number) | 0 | 2 | 1 | 0 | 0 | 1 | 0 |
| | Film foreign matter score | 10.1 | 21.3 | 9.8 | 10.8 | 10.5 | 10.4 | 11.4 |
| Evaluation of injected foreign matter | 100 μm or more and less than 300 μm (number) | 439 | 758 | 424 | 639 | 582 | 427 | 500 |
| | 300 μm or more and less than 500 μm (number) | 21 | 45 | 21 | 34 | 32 | 27 | 27 |
| | 500 μm or more (number) | 0 | 0 | 0 | 0 | 0 | 0 | 0 |
| | Injected foreign matter score | 14.2 | 25.0 | 13.8 | 20.9 | 19.1 | 14.2 | 16.4 |
| Whiteness index | | 47.3 | 49.1 | 37.9 | 47.3 | 46.3 | 47.0 | 40.2 |
| Yellow index | | 8.6 | 6.5 | 25.6 | 9.1 | 8.9 | 9.2 | 15.6 |

[1] Content of the metal carboxylic acid salt with respect to 100 parts of the ABS base resin weight in the extrusion feed

[2] Content of the polyhydric alcohol with respect to 100 parts of the ABS base resin weight in the extrusion feed 3) Mass ratio of the metal carboxylic acid salt to the polyhydric alcohol in the extrusion feed

TABLE 3

| | | Example 8 | Example 9 | Example 10 | Example 11 | Example 12 | Example 13 | Example 14 |
|---|---|---|---|---|---|---|---|---|
| Temperature in extruder (° C.) | | 260 | 260 | 260 | 230 | 270 | 260 | 260 |
| Content (parts) of metal carboxylic acid salt in extrusion feed [1] | | 0.1 | 0.3 | 0.3 | 0.3 | 0.3 | 0.3 | 0.3 |
| Content (parts) of polyhydric alcohol in extrusion feed [2] | | 0.9 | 0.6 | 0.6 | 0.6 | 0.6 | 0.6 | 1 |
| Mass ratio [3] | | 0.11 | 0.5 | 0.5 | 0.5 | 0.5 | 0.5 | 0.3 |
| Evaluation of film foreign matter | 100 μm or more and less than 300 μm (number) | 600 | 412 | 1545 | 718 | 283 | 987 | 1302 |
| | 300 μm or more and less than 500 μm (number) | 45 | 35 | 113 | 51 | 23 | 67 | 52 |
| | 500 μm or more (number) | 2 | 0 | 2 | 3 | 1 | 2 | 1 |
| | Film foreign matter score | 20.5 | 14.1 | 52.2 | 24.4 | 9.7 | 33.2 | 41.8 |
| Evaluation of injected foreign matter | 100 μm or more and less than 300 μm (number) | 700 | 477 | 1061 | 709 | 434 | 1391 | 1685 |
| | 300 μm or more and less than 500 μm (number) | 36 | 25 | 65 | 38 | 27 | 82 | 36 |
| | 500 μm or more (number) | 1 | 0 | 1 | 1 | 0 | 2 | 0 |
| | Injected foreign matter score | 22.9 | 15.6 | 35.2 | 23.3 | 14.4 | 46.0 | 52.4 |
| Whiteness index | | 49.0 | 47.5 | 48.4 | 47.9 | 42.1 | 46.6 | 46.7 |
| Yellow index | | 6.7 | 8.9 | 8.9 | 7.1 | 13.0 | 9.2 | 9.2 |

[1] Content of the metal carboxylic acid salt with respect to 100 parts of the ABS base resin weight in the extrusion feed
[2] Content of the polyhydric alcohol with respect to 100 parts of the ABS base resin weight in the extrusion feed
[3] Mass ratio of the metal carboxylic acid salt to the polyhydric alcohol in the extrusion feed

TABLE 4

| | | Example 15 | Example 16 | Example 17 | Example 18 | Example 19 | Example 20 | Example 21 |
|---|---|---|---|---|---|---|---|---|
| Temperature in extruder (° C.) | | 190 | 300 | 260 | 260 | 260 | 260 | 260 |
| Content (parts) of metal carboxylic acid salt in extrusion feed [1] | | 0.3 | 0.3 | 2 | 0.1 | 0.02 | 3.5 | 0.3 |
| Content (parts) of polyhydric alcohol in extrusion feed [2] | | 0.6 | 0.6 | 0.15 | 1.5 | 0.6 | 0.6 | 0.6 |
| Mass ratio [3] | | 0.5 | 0.5 | 13.33 | 0.07 | 0.03 | 5.83 | 0.5 |
| Evaluation of film foreign matter | 100 μm or more and less than 300 μm (number) | 2154 | 278 | 299 | 721 | 764 | 276 | 2431 |
| | 300 μm or more and less than 500 μm (number) | 153 | 20 | 26 | 46 | 59 | 16 | 169 |
| | 500 μm or more (number) | 4 | 1 | 1 | 1 | 1 | 0 | 4 |
| | Film foreign matter score | 72.7 | 9.4 | 10.4 | 24.0 | 26.0 | 9.1 | 81.8 |
| Evaluation of injected foreign matter | 100 μm or more and less than 300 μm (number) | 1159 | 415 | 523 | 466 | 759 | 355 | 1037 |
| | 300 μm or more and less than 500 μm (number) | 72 | 23 | 28 | 26 | 46 | 25 | 65 |
| | 500 μm or more (number) | 1 | 0 | 1 | 0 | 1 | 0 | 1 |
| | Injected foreign matter score | 38.5 | 13.6 | 17.2 | 15.3 | 25.2 | 11.9 | 34.5 |
| Whiteness index | | 48.9 | 18.5 | 34.9 | 49.3 | 49.2 | 27.9 | 46.8 |
| Yellow index | | 7.5 | 21.9 | 19.9 | 6.8 | 6.3 | 23.9 | 9.3 |

[1] Content of the metal carboxylic acid salt with respect to 100 parts of the ABS base resin weight in the extrusion feed
[2] Content of the polyhydric alcohol with respect to 100 parts of the ABS base resin weight in the extrusion feed
[3] Mass ratio of the metal carboxylic acid salt to the polyhydric alcohol in the extrusion feed

TABLE 5

| | | Comparative Example 1 | Comparative Example 2 | Comparative Example 3 | Comparative Example 4 |
|---|---|---|---|---|---|
| Temperature in extruder (° C.) | | 260 | 260 | 260 | 260 |
| Content (parts) of metal carboxylic acid salt in extrusion feed [1)] | | 0 | 0 | 0.3 | 0.3 |
| Content (parts) of polyhydric alcohol in extrusion feed [2)] | | 0 | 0.6 | 0 | 0.6 |
| Mass ratio [3)] | | — | 0 | — | 0.5 |
| Evaluation of film foreign matter | 100 μm or more and less than 300 μm (number) | 2768 | 1737 | 1340 | 1164 |
| | 300 μm or more and less than 500 μm (number) | 204 | 128 | 88 | 84 |
| | 500 μm or more (number) | 5 | 4 | 2 | 2 |
| | Film foreign matter score | 93.7 | 58.9 | 44.8 | 39.3 |
| Evaluation of injected foreign matter | 100 μm or more and less than 300 μm (number) | 5234 | 1417 | 1693 | 1576 |
| | 300 μm or more and less than 500 μm (number) | 304 | 76 | 88 | 87 |
| | 500 μm or more (number) | 5 | 1 | 2 | 1 |
| | Injected foreign matter score | 172.7 | 46.4 | 55.4 | 51.7 |
| Whiteness index | | 50.3 | 48.5 | 38.5 | 46.4 |
| Yellow index | | 5.9 | 6.2 | 12.1 | 8.6 |

[1)] Content of the metal carboxylic acid salt with respect to 100 parts of the ABS base resin weight in the extrusion feed
[2)] Content of the polyhydric alcohol with respect to 100 parts of the ABS base resin weight in the extrusion feed
[3)] Mass ratio of the metal carboxylic acid salt to the polyhydric alcohol in the extrusion feed From the above results, it was confirmed that the recycled ABS resins prepared according to the examples of the present invention had good film foreign matter scores and injected foreign matter scores.

Meanwhile, in Example 10 using zinc stearate as the metal carboxylic acid salt, the film foreign matter score and the injected foreign matter score were somewhat poor as compared with other examples using zinc acetate or potassium acetate, and this is considered as being due to the fact that zinc acetate and potassium acetate had less structural obstruction in the depolymerization reaction and excellent mobility due to their simple structure. In Examples 13 and 14 using ethylene glycol or polyethylene glycol, respectively as the polyhydric alcohol, the film foreign matter score and the injected foreign matter score were somewhat poor as compared with other examples, and it was found therefrom that the efficient depolymerization reaction of polyurethane was not performed due to the low boiling point of ethylene glycol as compared with glycerin, and polyethylene glycol had a low OH equivalent to mass (value obtained by dividing the number of OH groups per one molecule by a molecular weight) so that it was also difficult to perform an efficient depolymerization reaction of polyurethane.

Meanwhile, in Comparative Examples 1 to 4 in which the metal carboxylic acid salt or the polyhydric alcohol was not used, both the film foreign matter score and the injected foreign matter score were seriously poor. In particular, in Comparative Example 4 using a primary alcohol, it was found that the effect of improving surface properties was not achieved as expected, compared with the polyhydric alcohol.

In addition, in Example 15 in which the temperature in the extruder was low as compared with other examples, it was found that the effect of improving the film foreign matter score and the injected foreign matter score was not large, and it was found therefrom that it was difficult to sufficiently perform the depolymerization reaction of polyurethane at a low temperature in the extruder. However, in Example 16 having a high temperature in the extruder of 300° C., it was found that the surface foreign score was good, but the color properties of the yellow index was deteriorated. It was confirmed therefrom that when the temperature in the extruder was excessively high, deterioration of the physical properties such as discoloration of the recycled ABS resin by heat occurred.

Furthermore, referring to Examples 17 and 18, it was confirmed that when the mass ratio of the metal carboxylic acid salt to the polyhydric alcohol in the extrusion feed is excessively low or high, the color properties such as the yellow index were deteriorated or the surface properties such as the foreign matter score were deteriorated.

Meanwhile, in Example 19 using a low content of the metal carboxylic acid salt, it was found that an effect of improving the film foreign matter score and the injected foreign matter score was insignificant, and in Example 20 using a high content of the metal carboxylic acid salt, it was found that color properties were deteriorated.

In addition, referring to Example 21, when sodium acetate was used as the metal carboxylic acid salt, the effect of improving surface properties was not large as compared with the case of using zinc acetate in other examples.

The invention claimed is:

1. A method for preparing a recycled acrylonitrile butadiene styrene (ABS) resin, the method comprising:

preparing an extrusion feed including an acrylonitrile butadiene styrene (ABS) base resin, a metal carboxylic acid salt, and a polyhydric alcohol, wherein the ABS base resin includes ABS and polyurethane, and a mass ratio of the metal carboxylic acid salt to the polyhydric alcohol in the extrusion feed is 1:0.3 to 1:1; and supplying the extrusion feed to an extruder to perform a depolymerization reaction of the polyurethane, and extruding the extrusion feed.

2. The method for preparing a recycled ABS resin of claim 1, wherein the metal carboxylic acid salt includes one or more of zinc acetate, zinc stearate, and potassium acetate.

3. The method for preparing a recycled ABS resin of claim 1, wherein a content of the metal carboxylic acid salt in the extrusion feed is 0.05 parts to 3 parts by weight with respect to 100 parts by weight of the ABS base resin.

4. The method for preparing a recycled ABS resin of claim 1, wherein a content of the metal carboxylic acid salt in the extrusion feed is 0.1 parts to 2 parts by weight with respect to 100 parts by weight of the ABS base resin.

5. The method for preparing a recycled ABS resin of claim 4, wherein the metal carboxylic acid salt includes zinc acetate.

6. The method for preparing a recycled ABS resin of claim 5, wherein the polyhydric alcohol includes glycerin.

7. The method for preparing a recycled ABS resin of claim 1, wherein the polyhydric alcohol has a boiling point of 200° C. or higher.

8. The method for preparing a recycled ABS resin of claim 1, wherein the polyhydric alcohol includes one or more of glycerin and erythritol.

9. The method for preparing a recycled ABS resin of claim 1, wherein a content of the polyhydric alcohol in the extrusion feed is 0.01 parts to 3 parts by weight with respect to 100 parts by weight of the ABS base resin.

10. The method for preparing a recycled ABS resin of claim 1, wherein a temperature inside the extruder is 200° C. to 280° C.

11. The method for preparing a recycled ABS resin of claim 1, wherein a residence time of the extrusion feed in the extruder is 0.5 minutes to 10 minutes.

12. The method for preparing a recycled ABS resin of claim 1, further comprising, after the performing of a depolymerization reaction of the polyurethane and the extruding of the extrusion feed: supplying an extrusion composition discharged from the extruder to a pelletizer to perform pelletization.

* * * * *